US012748326B2

(12) United States Patent
Yang et al.

(10) Patent No.: US 12,748,326 B2
(45) Date of Patent: Sep. 29, 2026

(54) TOUCH DISPLAY DEVICE AND MANUFACTURING METHOD THEREOF

(71) Applicant: E Ink Holdings Inc., Hsinchu (TW)

(72) Inventors: Ming-Huan Yang, Hsinchu (TW); Wei-Sung Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 334 days.

(21) Appl. No.: 18/360,829

(22) Filed: Jul. 28, 2023

(65) Prior Publication Data

US 2024/0045300 A1 Feb. 8, 2024

(30) Foreign Application Priority Data

Aug. 2, 2022 (TW) ................................. 111128881

(51) Int. Cl.

*G02F 1/1333* (2006.01)
*G02F 1/1339* (2006.01)
*G02F 1/1345* (2006.01)
*G02F 1/1677* (2019.01)
*G02F 1/1679* (2019.01)

(52) U.S. Cl.

CPC .... *G02F 1/13338* (2013.01); *G02F 1/133308* (2013.01); *G02F 1/1339* (2013.01); *G02F 1/13452* (2013.01); *G02F 1/1677* (2019.01); *G02F 1/1679* (2019.01)

(58) Field of Classification Search

CPC .. G06F 3/0412; G02F 1/13338; G02F 1/1679; G02F 2202/28; H10K 59/8722; H05B 33/04

See application file for complete search history.

(56) References Cited

U.S. PATENT DOCUMENTS

| | | | | |
|---|---|---|---|---|
| 9,437,831 | B2 | 9/2016 | Yamazaki et al. | |
| 9,625,764 | B2 | 4/2017 | Yamazaki et al. | |
| 11,004,925 | B2 | 5/2021 | Yamazaki et al. | |
| 2011/0090162 | A1* | 4/2011 | Shih ........................ | G02F 1/167 345/173 |

(Continued)

FOREIGN PATENT DOCUMENTS

| | | |
|---|---|---|
| CN | 106547401 | 3/2017 |
| CN | 107272951 | 10/2017 |

(Continued)

*Primary Examiner* — Yuzhen Shen

(74) *Attorney, Agent, or Firm* — JCIPRNET

(57) ABSTRACT

A touch display device includes a driving substrate, a display medium layer, an electrode substrate, a touch panel, a flexible circuit board, a water-blocking adhesive layer, and a sealant layer. The touch panel is disposed on the electrode substrate and has a bonding area. The flexible circuit board is bonded to the bonding area of the touch panel and extends to outside of the touch panel. The water-blocking adhesive layer is directly connected between a bottom surface of the flexible circuit board outside the touch panel and a top surface of the driving substrate. The sealant layer is disposed on the driving substrate and seals an edge of the display medium layer, an edge of the electrode substrate, and an edge of the touch panel. In a cross-sectional view, the sealant layer is located between the water-blocking adhesive layer and the edge of the display medium layer.

8 Claims, 3 Drawing Sheets

(56) References Cited

U.S. PATENT DOCUMENTS

| | | | | |
|---|---|---|---|---|
| 2012/0120364 | A1* | 5/2012 | Wu | G02F 1/167 445/25 |
| 2013/0082942 | A1* | 4/2013 | Yu | G02F 1/167 345/173 |
| 2014/0192272 | A1* | 7/2014 | Kang | G02F 1/13338 361/728 |
| 2016/0062206 | A1* | 3/2016 | Paolini, Jr. | B32B 38/10 156/247 |
| 2017/0031471 | A1 | 2/2017 | Yamazaki et al. | |
| 2018/0076231 | A1 | 3/2018 | Yamazaki et al. | |
| 2018/0143482 | A1 | 5/2018 | Jin et al. | |

FOREIGN PATENT DOCUMENTS

| | | |
|---|---|---|
| CN | 112318885 | 2/2021 |
| CN | 215895429 | 2/2022 |

* cited by examiner

TOUCH DISPLAY DEVICE AND MANUFACTURING METHOD THEREOF

CROSS-REFERENCE TO RELATED APPLICATION

This application claims the priority benefit of Taiwan application serial no. 111128881, filed on Aug. 2, 2022. The entirety of the above-mentioned patent application is hereby incorporated by reference herein and made a part of this specification.

BACKGROUND

Technical Field

The disclosure relates to a display device and a manufacturing method thereof, and in particular to a touch display device and a manufacturing method thereof.

Description of Related Art

At present, in the process of electrophoretic display module, the sealant is applied after the upper electrode substrate is laminated, and the space formed by the upper electrode substrate and the driving substrate is filled with the sealant to prevent the invasion of moisture. However, after the upper electrode substrate is laminated, there is still a protective layer on its surface. Since the material properties of the sealant have a good affinity with the plastic substrate, the applied sealant can easily creep and overflow onto the protective layer. When the protective layer is removed, the sealant protrusion of the sealant will be formed. Later, when the touch panel is laminated to the electrophoretic display module to form the touch display device, the bonding area of the touch panel is located right above the sealant protrusion of the sealant, which will easily damage the metal lines on the touch panel and cause the touch display device to fail in the thermal shock test.

SUMMARY

The disclosure provides a touch display device with better structural reliability and may pass thermal shock test.

The disclosure provides a manufacturing method of a touch display device for manufacturing the touch display device.

The touch display device of the disclosure includes a driving substrate, a display medium layer, an electrode substrate, a touch panel, a flexible circuit board, a water-blocking adhesive layer, and a sealant layer. The display medium layer is disposed on the driving substrate. The electrode substrate is disposed on the display medium layer. The touch panel is disposed on the electrode substrate and has a bonding area. The flexible circuit board is bonded to the bonding area of the touch panel and extends to outside of the touch panel. The water-blocking adhesive layer is directly connected between a bottom surface of the flexible circuit board outside the touch panel and a top surface of the driving substrate. The sealant layer is disposed on the driving substrate, and seals an edge of the display medium layer, an edge of the electrode substrate, and an edge of the touch panel. In a cross-sectional view, the sealant layer is located between the water-blocking adhesive layer and the edge of the display medium layer.

According to an embodiment of the disclosure, the edge of the display medium layer is indented by a distance relative to the edge of the electrode substrate to form a space. The sealant layer fills the space and extends to cover the edge of the electrode substrate and the edge of the touch panel.

According to an embodiment of the disclosure, the touch display device further includes an adhesive layer disposed between the touch panel and the electrode substrate.

According to an embodiment of the disclosure, the touch display device further includes a light guide plate and a cover plate. The light guide plate is disposed on the touch panel. The cover plate is disposed on the light guide plate.

According to an embodiment of the disclosure, the touch display device further includes a first adhesive layer and a second adhesive layer. The first adhesive layer is disposed between the light guide plate and the touch panel. The second adhesive layer is disposed between the cover plate and the light guide plate.

According to an embodiment of the disclosure, the touch display device further includes an external circuit connecting the driving substrate.

The manufacturing method of the touch display device of the disclosure includes the following steps. A display medium layer and an electrode substrate are formed on a driving substrate in sequence. A flexible circuit board is bonded to a bonding area of a touch panel. The flexible circuit board extends outside the touch panel. A water-blocking adhesive layer is attached on the flexible circuit board outside the touch panel. The water-blocking adhesive layer is directly connected to a bottom surface of the flexible circuit board. The touch panel is bonded to the electrode substrate, so that the water-blocking adhesive layer is directly laminated to a top surface of the driving substrate. A sealant layer is filled on the driving substrate to seal an edge of the display medium layer, an edge of the electrode substrate, and an edge of the touch panel. In a cross-sectional view, the sealant layer is located between the water-blocking adhesive layer and the edge of the display medium layer.

According to an embodiment of the disclosure, the manufacturing method of the touch display device further includes providing a light guide plate on the touch panel; and providing a cover plate on the light guide plate.

According to an embodiment of the disclosure, the manufacturing method of the touch display device further includes forming a first adhesive layer between the light guide plate and the touch panel; and forming a second adhesive layer between the cover plate and the light guide plate.

According to an embodiment of the disclosure, the edge of the display medium layer is indented by a distance relative to the edge of the electrode substrate to form a space. The sealant layer fills the space and extends to cover the edge of the electrode substrate and the edge of the touch panel.

Based on the above, in the design of the touch display device of the disclosure, the water-blocking adhesive layer is directly connected between the bottom surface of the flexible circuit board outside the touch panel and the top surface of the driving substrate, and in a cross-sectional view, the sealant layer is located between the water-blocking adhesive layer and the edge of the display medium layer. That is, there is no sealant layer on the bottom surface of the flexible circuit board outside the touch panel, and thus no damage is caused to the metal lines on the touch panel. Therefore, the touch display device of the disclosure may have better structural reliability and may pass the thermal shock test.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The embodiments of the disclosure may be understood together with the drawings, and the drawings of the disclosure are also considered as part of the disclosure. It should be understood that the drawings of the disclosure are not drawn to scale and, in fact, the size of the elements may be arbitrarily enlarged or reduced in order to clearly represent the features of the disclosure. In addition, when referring to the first layer being located on or above the second layer, it may include the situation where the first layer is in direct contact with the second layer or where the first layer may not be in direct contact with the second layer, i.e., there may be one or more other structural layers separating the first layer from the second layer. However, if the first layer is located directly on the second layer, it means that the first layer is in direct contact with the second layer.

Figure 1:
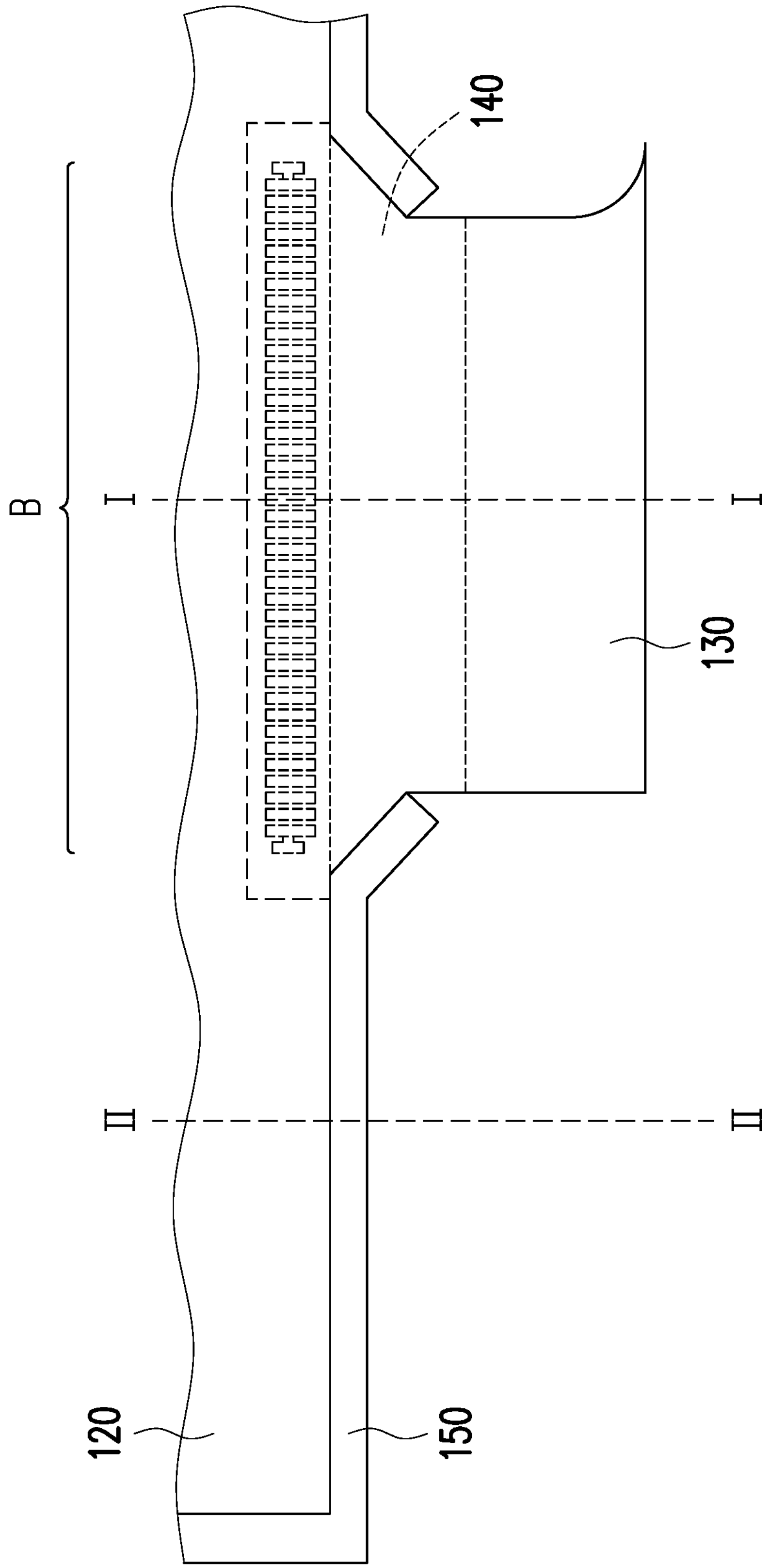
FIG. 1 is a partial top schematic view of a touch display device according to an embodiment of the disclosure.
Figure 2:
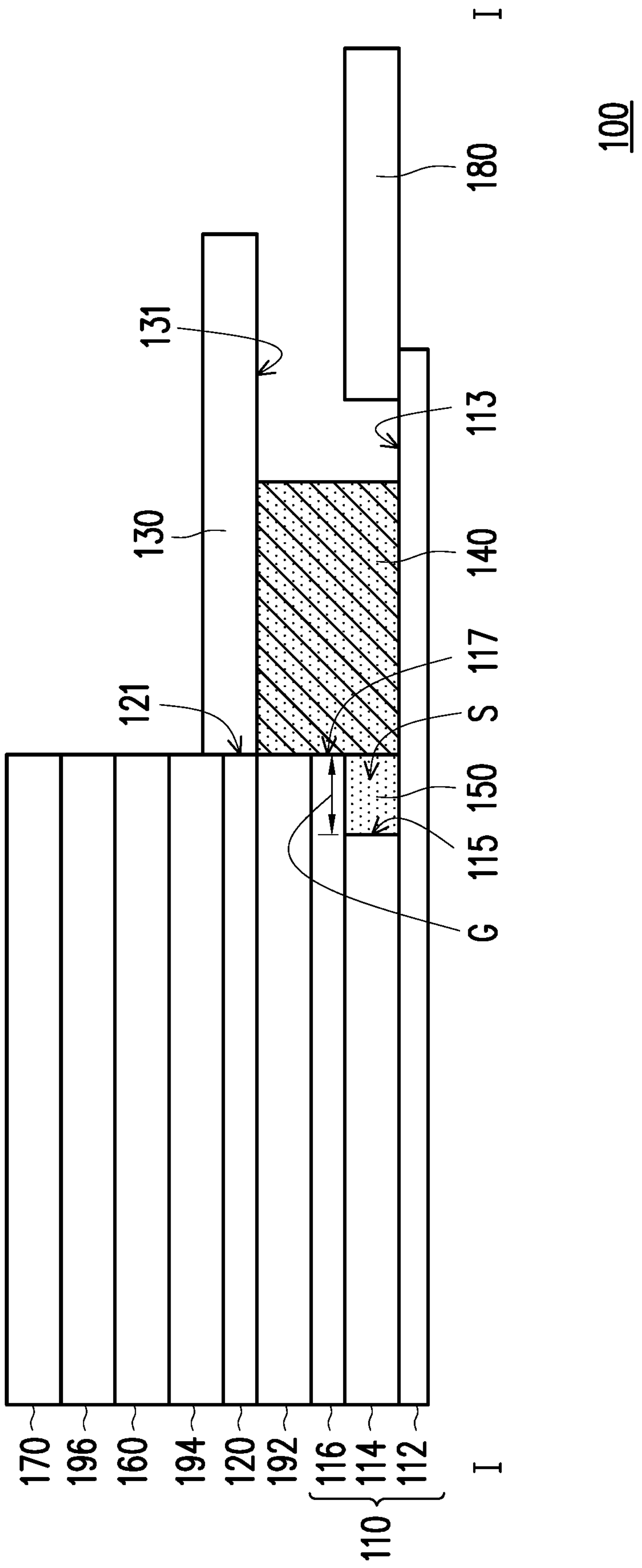
FIG. 2 is a schematic cross-sectional view along a line I-I of FIG. 1.
Figure 3:
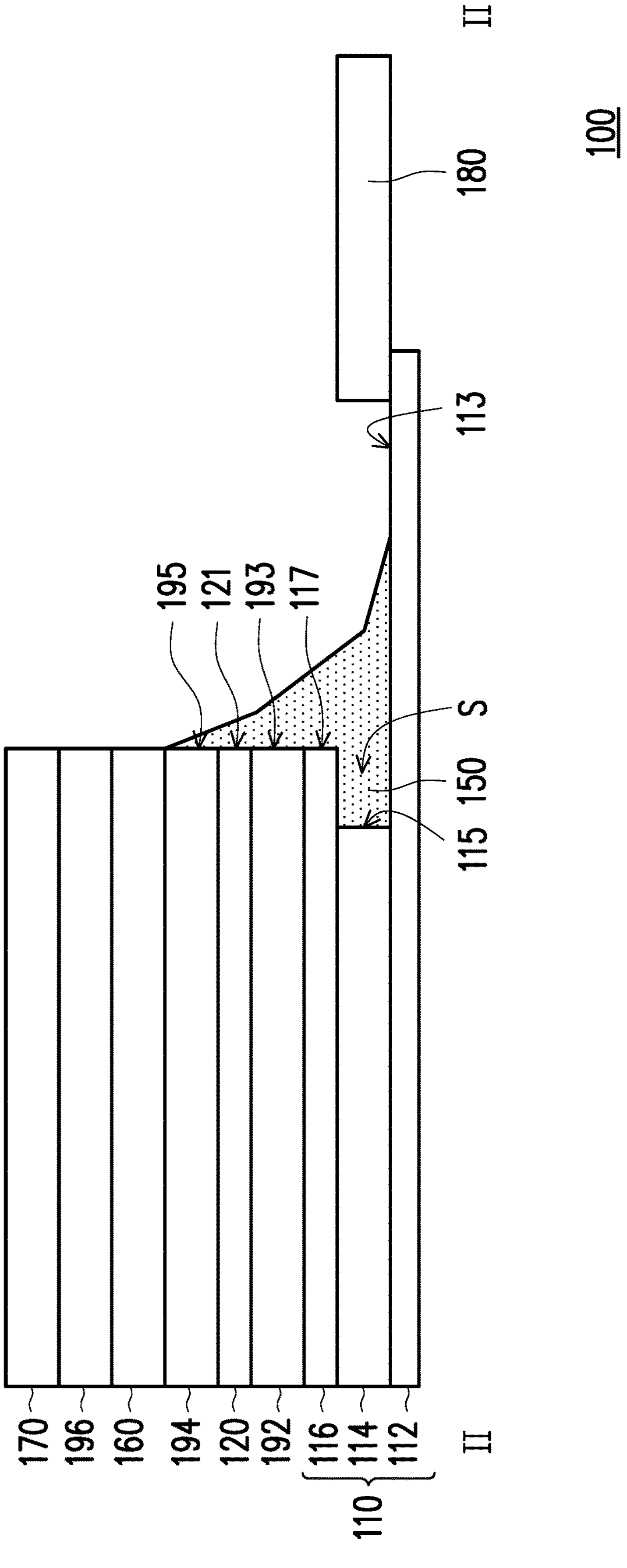
FIG. 3 is a schematic cross-sectional view along a line II-II of FIG. 1.

FIG. 1 is a partial top schematic view of a touch display device according to an embodiment of the disclosure. FIG. 2 is a schematic cross-sectional view along a line I-I of FIG. 1. FIG. 3 is a schematic cross-sectional view along a line II-II of FIG. 1. Referring to FIG. 1, FIG. 2, and FIG. 3, according to this embodiment, a touch display device 100 includes a driving substrate 112, a display medium layer 114, an electrode substrate 116, a touch panel 120, a flexible circuit board 130, a water-blocking adhesive layer 140, and a sealant layer 150. The display medium layer 114 is disposed on the driving substrate 112. The electrode substrate 116 is disposed on the display medium layer 114. The touch panel 120 is disposed on the electrode substrate 116 and has a bonding area B. The flexible circuit board 130 is bonded to the bonding area B of the touch panel 120 and extends outside the touch panel 120. The water-blocking adhesive layer 140 is directly connected between a bottom surface 131 of the flexible circuit board 130 outside the touch panel 120 and a top surface 113 of the driving substrate 112. The sealant layer 150 is disposed on the driving substrate 112 and seals an edge 115 of the display medium layer 114, an edge 117 of the electrode substrate 116, and an edge 121 of the touch panel 120. In a cross-sectional view, the sealant layer 150 is located between the water-blocking adhesive layer 140 and the edge 115 of the display medium layer 114.

In detail, in this embodiment, the driving substrate 112 is, for example, an active element array substrate, which may be, for example, a thin film transistor (TFT) array substrate or a thin film diode (TFD) array substrate, but not limited thereto. The electrode substrate 116 is, for example, composed of a transparent substrate, a barrier layer, and a transparent electrode layer (such as an ITO layer), but not limited thereto. Here, the driving substrate 112, the display medium layer 114, and the electrode substrate 116 may define a display panel 110. The display panel 110 is, for example, an electrophoretic display panel, an organic light emitting diode display panel, or a liquid crystal display panel, but not limited thereto.

As shown in FIG. 1 and FIG. 2, according to this embodiment, at the bonding area B of the touch panel 120, viewed along a cross-section (i.e., along the section line I-I), the edge 115 of the display medium layer 114 is indented by a distance G relative to the edge 117 of the electrode substrate 116 to form a space S, and the sealant layer 150 fills the space S. Viewed along another cross-section (i.e., along the section line II-II), the sealant layer 150 extends to cover the edge 117 of the electrode substrate 116 and the edge 121 of the touch panel 120. Since the water-blocking adhesive layer 140 according to this embodiment is directly connected between the bottom surface 131 of the flexible circuit board 130 outside the touch panel 120 and the top surface 113 of the driving substrate 112, there will be no sealant layer 150 on the bottom surface 131 of the flexible circuit board 130 outside the touch panel 120, and thus no damage will be caused to the lines of the touch panel 120. Therefore, the touch display device 100 according to this embodiment may have better structural reliability and may pass thermal shock test.

Furthermore, the touch display device 100 according to this embodiment further includes an adhesive layer 192 disposed between the touch panel 120 and the electrode substrate 116. The touch panel 120 is fixed on the electrode substrate 116 through the adhesive layer 192. Moreover, the touch display device 100 further includes a light guide plate 160 and a cover plate 170. The light guide plate 160 is disposed on the touch panel 120, and the cover plate 170 is disposed on the light guide plate 160. The touch display device 100 according to this embodiment further includes an adhesive layer 194 (i.e., a first adhesive layer) and an adhesive layer 196 (i.e., a second adhesive layer). The adhesive layer 194 is disposed between the light guide plate 160 and the touch panel 120. The light guide plate 160 is fixed on the touch panel 120 through the adhesive layer 194. The adhesive layer 196 is disposed between the cover plate 170 and the light guide plate 160. The cover plate 170 is fixed on the light guide plate 160 through the adhesive layer 196. In addition, the touch display device 100 according to this embodiment further includes an external circuit 180 that is structurally and electrically connected to the driving substrate 112. Here, the external circuit 180 is, for example, a flexible circuit board, but not limited thereto.

According to one embodiment, a thickness of the water-blocking adhesive layer 140 is, for example, a thickness of the display medium layer 114 (e.g., 55 μm) plus a thickness of the electrode substrate 116 (e.g., 10 μm) and a thickness of the adhesive layer 192 (e.g., 50 μm). A thickness of the driving substrate 112 (e.g., 14 μm) is approximately equal to a thickness of the touch panel 120 (e.g., 13 μm). A thickness of the cover plate 170, a thickness of the light guide plate 160, a thickness of the adhesive layer 194, a thickness of the adhesive layer 196, a thickness of the flexible circuit board 130, and a thickness of the external circuit 180 are approximately the same, and are, for example, 50 μm, respectively.

In the process of the touch display device 100, referring to FIG. 2 again, the display medium layer 114 and the electrode substrate 116 may be formed on the driving substrate 112 in sequence. On the other hand, the flexible circuit board 130 may be bonded to the bonding area B of the touch panel 120, where the flexible circuit board 130 extends outside the touch panel 120. Next, the water-blocking adhesive layer 140 is attached on the flexible circuit board 130 outside the touch panel 120, where the water-blocking adhesive layer 140 is directly connected to the bottom surface 131 of the flexible circuit board 130. Next, the touch panel 120 with the water-blocking adhesive layer 140 attached thereto is bonded to the electrode substrate 116 through the adhesive layer 192, and the water-blocking adhesive layer 140 is directly laminated to the top surface 113 of the driving substrate 112. At this time, the water-blocking adhesive layer 140 is directly connected between the bottom surface 131 of the flexible circuit board 130 outside the touch panel 120 and the top surface 113 of the driving substrate 112. After that, the sealing layer 150 is filled on the driving substrate 112 to seal the edge 115 of the display medium layer 114, the edge 117 of the electrode substrate 116, and the edge 121 of the touch panel 120. In short, according to this embodiment, the water-blocking adhesive layer 140 is firstly attached to the touch panel 120, then the touch panel 120 with the water-blocking adhesive layer 140 attached thereto is bonded to the display panel 110, and finally, the sealant layer 150 is filled in the space S formed by the touch panel 120 and the display panel 110. Finally, the adhesive layer 194, the light guide plate 160, the adhesive layer 196, and the cover plate 170 are formed on the touch panel 120 in sequence. The adhesive layer 194 is formed between the light guide plate 160 and the touch panel 120, and the light guide plate 160 is fixed on the touch panel 120 through the adhesive layer 194. The adhesive layer 196 is formed between the cover plate 170 and the light guide plate 160, and the cover plate 170 is fixed on the light guide plate 160 through the adhesive layer 196. At this point, the touch panel display device 100 is completed.

According to one embodiment, if the adhesive material of the sealant layer 150 has a low viscosity and is prone to ooze, the capillary phenomenon ooze principle can be used to allow the sealant layer 150 to expand and fill the space S in the middle on both sides of the line of the bonding area B of the touch panel 120. Since the bottom surface 131 of the flexible circuit board 130 outside the touch panel 120 does not have the sealant layer 150, no damage is caused to the lines of the touch panel 120 when the touch panel 120 is laminated. On the other hand, if the adhesive material of the sealant layer 150 is more viscous, since the water-blocking adhesive layer 140 is first attached to the bottom surface 131 of the flexible circuit board 130, and then the touch panel 120 with the water-blocking adhesive layer 140 attached thereto is assembled to the display panel 110, and finally the sealant layer 150 is filled, the sealant layer 150 only needs to be filled/coated in the space S on the inside of the water-blocking adhesive layer 140. Since the bottom surface 131 of the flexible circuit board 130 outside the touch panel 120 does not have the sealant layer 150, no damage is caused to the lines of the touch panel 120 when the touch panel 120 is laminated.

To sum up, in the design of the touch display device of the disclosure, the water-blocking adhesive layer is directly connected between the bottom surface of the flexible circuit board outside the touch panel and the top surface of the driving substrate, and in a cross-sectional view, the sealant layer is located between the water-blocking adhesive layer and the edge of the display medium layer. That is, there is no sealant layer on the bottom surface of the flexible circuit board outside the touch panel, and thus no damage is caused to the metal lines on the touch panel. Therefore, the touch display device of the disclosure may have better structural reliability and may pass the thermal shock test.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. A touch display device comprising:
  - a driving substrate;
  - a display medium layer disposed on the driving substrate;
  - an electrode substrate disposed on the display medium layer;
  - a touch panel disposed on the electrode substrate and having a bonding area;
  - a flexible circuit board bonded to the bonding area of the touch panel and extending to outside of the touch panel;
  - a water-blocking adhesive layer directly connected between a bottom surface of the flexible circuit board outside the touch panel and a top surface of the driving substrate; and
  - a sealant layer disposed on the driving substrate and sealing an edge of the display medium layer, an edge of the electrode substrate, and an edge of the touch panel, wherein in a cross-sectional view;
  - at the bonding area of the touch panel, the edge of the display medium layer is indented by a distance relative to the edge of the electrode substrate to form a space, and the sealant layer fills the space and is located between the water-blocking adhesive layer and the edge of the display medium layer, and there is no the sealant layer on the bottom surface of the flexible circuit board outside the touch panel; wherein in another cross-sectional view outside the bonding area, the sealant layer extends to cover the edge of the electrode substrate and the edge of the touch panel.

2. The touch display device according to claim 1 further comprising:
  - an adhesive layer disposed between the touch panel and the electrode substrate.

3. The touch display device according to claim 1 further comprising:
  - a light guide plate disposed on the touch panel; and
  - a cover plate disposed on the light guide plate.

4. The touch display device according to claim 3 further comprising:
  - a first adhesive layer disposed between the light guide plate and the touch panel; and
  - a second adhesive layer disposed between the cover plate and the light guide plate.

5. The touch display device according to claim 1 further comprising:
  - an external circuit connecting the driving substrate.

6. A manufacturing method of a touch display device comprising:
  - forming a display medium layer and an electrode substrate on a driving substrate in sequence;
  - bonding a flexible circuit board to a bonding area of a touch panel, wherein the flexible circuit board extends outside the touch panel;
  - attaching a water-blocking adhesive layer on the flexible circuit board outside the touch panel, wherein the water-blocking adhesive layer is directly connected to a bottom surface of the flexible circuit board;

bonding the touch panel to the electrode substrate such that the water-blocking adhesive layer is directly laminated to a top surface of the driving substrate; and filling a sealant layer on the driving substrate to seal an edge of the display medium layer, an edge of the electrode substrate, and an edge of the touch panel, wherein in a cross-sectional view;

at the bonding area of the touch panel, the edge of the display medium layer is indented by a distance relative to the edge of the electrode substrate to form a space, and the sealant layer fills the space and is located between the water-blocking adhesive layer and the edge of the display medium layer, and there is no the sealant layer on the bottom surface of the flexible circuit board outside the touch panel; wherein in another cross-sectional view outside the bonding area, the sealant layer extends to cover the edge of the electrode substrate and the edge of the touch panel.

7. The manufacturing method of the touch display device according to claim 6 further comprising:

providing a light guide plate on the touch panel; and providing a cover plate on the light guide plate.

8. The manufacturing method of the touch display device according to claim 7 further comprising:

forming a first adhesive layer between the light guide plate and the touch panel; and forming a second adhesive layer between the cover plate and the light guide plate.

* * * * *